(12) United States Patent
Krishna et al.

(10) Patent No.: US 7,293,113 B1
(45) Date of Patent: Nov. 6, 2007

(54) DATA COMMUNICATION SYSTEM WITH HARDWARE PROTOCOL PARSER AND METHOD THEREFOR

(75) Inventors: Gopal Krishna, San Jose, CA (US); Mrudula Kanuri, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 849 days.

(21) Appl. No.: 10/447,824

(22) Filed: May 28, 2003

(51) Int. Cl.
 *G06F 15/16* (2006.01)
 *G06F 1/32* (2006.01)
(52) U.S. Cl. ...................... 709/250; 713/324
(58) Field of Classification Search ............. 709/250; 713/320, 324, 323
 See application file for complete search history.

(56) References Cited

U.S. PATENT DOCUMENTS

| | | | | |
|---|---|---|---|---|
| 5,742,833 A | * | 4/1998 | Dea et al. | 713/323 |
| 6,289,377 B1 | * | 9/2001 | Lalwaney et al. | 709/222 |
| 6,446,192 B1 | * | 9/2002 | Narasimhan et al. | 712/29 |
| 6,449,656 B1 | | 9/2002 | Elzur et al. | |
| 6,484,210 B1 | * | 11/2002 | Adriano et al. | 709/239 |
| 6,678,283 B1 | * | 1/2004 | Teplitsky | 370/463 |
| 6,862,274 B1 | * | 3/2005 | Tsao et al. | 370/338 |
| 6,993,667 B1 | * | 1/2006 | Lo | 713/320 |
| 7,050,394 B2 | * | 5/2006 | Johnson et al. | 370/230.1 |
| 7,080,238 B2 | * | 7/2006 | Van Hoof et al. | 712/234 |
| 7,127,521 B2 | * | 10/2006 | Hsu et al. | 709/233 |
| 2001/0002908 A1 | * | 6/2001 | Rune et al. | 370/392 |
| 2003/0165142 A1 | * | 9/2003 | Mills et al. | 370/395.62 |

* cited by examiner

*Primary Examiner*—Andrew Caldwell
*Assistant Examiner*—Douglas Blair (57) ABSTRACT

A communication processor comprises a data link layer parser circuit (310) and a plurality of network layer parser circuits (322, 326). The data link layer parser circuit (310) receives a data link layer frame, and removes a data link layer header therefrom to provide a network layer frame as an output. Each network layer parser circuit corresponds to a different network layer protocol, and is selectively activated to receive the network layer frame and to process a network layer header therefrom to provide a transport layer frame as an output. The data link layer parser circuit (310) further examines a portion of the network layer frame to determine which of the plurality of network protocols is used. The data link layer parser circuit (310) activates a corresponding one of the plurality of network layer parser circuits (322, 326) in response, while keeping another one of the plurality of network layer parser circuits (322, 326) inactive.

20 Claims, 6 Drawing Sheets

DATA COMMUNICATION SYSTEM WITH HARDWARE PROTOCOL PARSER AND METHOD THEREFOR

TECHNICAL FIELD OF THE INVENTION

The present invention generally relates to data communication, and more specifically to data communication systems that perform some of the data communication task in hardware.

BACKGROUND OF THE INVENTION

Data communication is usually described in terms of a model developed by the International Organization for Standardization (ISO) in 1977 known as the open systems interconnect (OSI) reference model. According to this model, the data communication task is broken down into seven hierarchical layers: 1. physical; 2. data link; 3. network; 4. transport; 5. session; 6. presentation; and 7. application. Each layer uses the layer immediately below it and provides a service to the layer above. The layers are modular and each layer can perform its processing without knowing the protocol selected at the other layers.

Different tasks are performed in each layer and more abstract tasks are performed at higher layers of the hierarchy. The physical layer (Layer 1) is responsible for controlling the functioning of the physical (electrical) interface and includes the transmission technique, pin layout, and connector type. Typical physical layer protocols include RS-232 physical layer, 10BaseX, 100BaseX, and OC-1 through OC-48.

The data link layer (Layer 2) takes raw data received from the physical layer and determines the frame boundaries, separates header information, and checks the integrity of the data. The data link layer is also responsible for station addressing, logical network topology, synchronization, and connection. Typical data link layer protocols include peer-to-peer protocol (PPP), systems network architecture (SNA), and IEEE 802.2. Sometimes the data link layer is broken down into two sub-layers, the media access control (MAC) sub-layer and the logical link control (LLC) sub-layer hierarchically above the MAC sub-layer.

The network layer (Layer 3) is responsible for routing the packets over the network. The most common network protocol is internet protocol (IP). This protocol is responsible for assigning and decoding IP addresses that identify entities that are coupled to the network. There are two versions of the internet protocol in use, version 4 (IPv4) and version 6 (IPv6).

The transport layer (Layer 4) is responsible for such things as reliable data transfer between two end points and may use sequencing, error control and general flow control to achieve reliable data transfer. Typical transport protocols include Transmission Control Protocol (TCP), User Datagram Protocol (UDP), and Internet Control Messaging Protocol (ICMP).

The session layer (Layer 5) defines how networked devices establish, maintain, and end a session. The presentation layer (Layer 6) is responsible for formatting data, converting character sets, encrypting, compressing and decompressing, and redirecting data. The application layer (Layer 7) provides a set of tools that a user's application program can use to accomplish a task in a network, such as file, print, messaging, and error recovery. These include electronic mail (E-mail), newsgroups, web applications, file transfer, host sessions, directory services, network management, and file services.

While the lower four layers of the OSI reference model are modular, the upper protocol layers are usually linked together as a set. For example if a user's application program selects world wide web services at Layer 7, the hypertext transport protocol (http) will usually be selected at Layer 6 and corresponding port 80 will be selected at Layer 5. If a user's application program selects E-mail at Layer 7, post office protocol (POP) using port 20, simple mail transfer protocol (SMTP) using port 25, or internet mail access protocol (IMAP) using port 143 will usually be selected.

A data communication host terminal performs lower layers of the OSI model in hardware and the remaining, higher layers in software. A typical implementation performs Layer 1 and the MAC sub-layer of Layer 2 in hardware. The remaining layers including the LLC sub-layer and all higher layers are performed in software.

Recent advances in integrated circuit technology have made higher performance networks possible. Thus, so-called Gigabit Ethernet in which transmission speeds exceed 1 gigabit per second (Gbps) and 10-Gigabit Ethernet with speeds of 10 Gbps are now available. However when data rates are this large, the overhead on the central processing unit (CPU) for performing the software portions of the OSI data communication task goes up as well. Accordingly, it is desirable to have a data communication system which is able to perform more of the communication task in hardware to free the CPU to perform other tasks and to perform them efficiently. Such a data communication system and other desirable features and characteristics of the present invention will become apparent from the subsequent detailed description and the appended claims, taken in conjunction with the accompanying drawings and the foregoing technical field and background.

BRIEF SUMMARY OF THE INVENTION

A communication processor includes a data link layer parser circuit and a plurality of network layer parser circuits. The data link layer parser circuit has an input for receiving a data link layer frame, and removes a data link layer header therefrom to provide a network layer frame as an output. Each network layer parser circuit corresponds to a different one of a corresponding plurality of network layer protocols, and is selectively activated to receive the network layer frame and to remove a network layer header therefrom to provide a transport layer frame as an output. The data link layer parser circuit further examines a portion of the network layer frame to determine which of the plurality of network protocols is used. The data link layer parser activates a corresponding one of the plurality of network layer parser circuits in response, while keeping another one of the plurality of network layer parser circuits inactive.

A method for use in a data communication system is also provided. A data link layer frame is received and parsed using a data link layer parser circuit to separate a data link layer header from a data link layer payload. The data link layer payload is parsed, using the data link layer parser circuit, to identify an active network layer protocol associated with said data link layer frame. A selected one of a plurality of network layer circuits corresponding to an identified network layer protocol is activated using the data link layer parser circuit, while another one of the plurality of network layer circuits is kept inactive. The data link layer payload is processed using the selected one of the plurality of network layer circuits.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
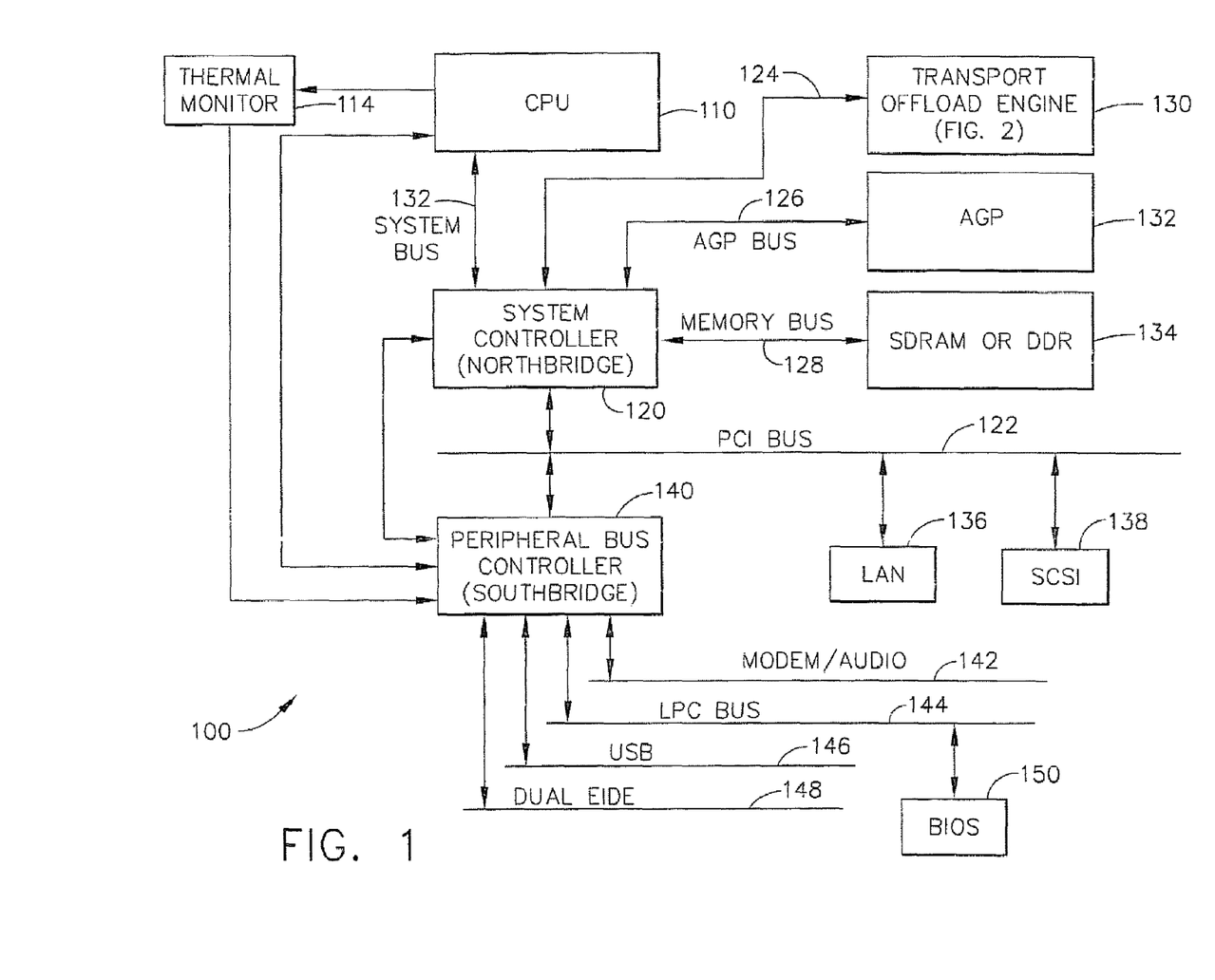
FIG. 1 illustrates a block diagram of a computer system implementing a data communication system according to the present invention.

FIG. 1 illustrates a block diagram of a computer system 100 implementing a data communication system according to the present invention. Generally computer system 100 is a conventional personal computer (PC) system based on the so-called x86 architecture. Computer system 100 includes a high-performance central processing unit (CPU) 110 that executes x86 instructions such as the microprocessor sold under the Athlon trademark available from Advanced Micro Devices of Sunnyvale, Calif. CPU 110 generally interfaces to external devices over a system bus 112 by which it is coupled to a system controller 120, conventionally referred to as a "Northbridge". Northbridge 120 offloads CPU 110 of the task of communicating with high performance system resources which may have different bus structures. One of these devices is main memory 134 in the form of synchronous dynamic random access memory (SDRAM) or double data rate (DDR) SDRAM over a dedicated memory bus 128. Another one of these devices is an advanced graphics processor (AGP) 132 over an AGP bus 126. According to the present invention a further one of these devices is a transport offload engine (TOE) 130 coupled to Northbridge 120 over a TOE bus 124 as will be described more fully below.

Northbridge 120 also is coupled to a lower performance peripheral component interconnect (PCI) bus 122 to which several other devices, including a local area network (LAN) controller 136 and a small computer system interface (SCSI) controller 138, are coupled. Also coupled to PCI bus 122 is a peripheral bus controller 140, conventionally referred to as a "Southbridge", for coupling to even lower performance devices. Southbridge 122 has various dedicated buses including a modem/audio bus 142, a Low Pin Count (LPC) bus 144, a universal serial bus (USB) 146, and a dual Enhanced Integrated Drive Electronics (EIDE) bus 148. One of the devices coupled to LPC bus 144 is a basic input/output system (BIOS) read only memory (ROM) chip 150. Southbridge 140 is coupled to a thermal monitor 114 which is coupled to CPU 110 and allows Southbridge 140 to perform power management functions if CPU 110 exceeds a certain temperature during operation. Finally Southbridge 140 has a bidirectional connection to CPU 110 by which CPU 110 programs it for operation.

Other aspects of system 100 shown in FIG. 1 are conventional and will not be discussed further. In addition note that computer system 100 is only exemplary and the data communication technique disclosed herein may be used in other computer systems. For example, TOE 130 could be combined with LAN block 136 and interface to Northbridge 120 either directly or over PCI bus 122. In system 100 TOE 130 is coupled to Northbridge 120 to facilitate high-speed data communication such as Gigabit Ethernet or 10 Gigabit Ethernet. Advantageously in order to ease the burden on CPU 110, TOE 130 performs hardware parsing of received frames, including headers and options, up through the transport layer for various protocols, including IPv4, IPv6, TCP, UDP, and ICMP.

Figure 2:
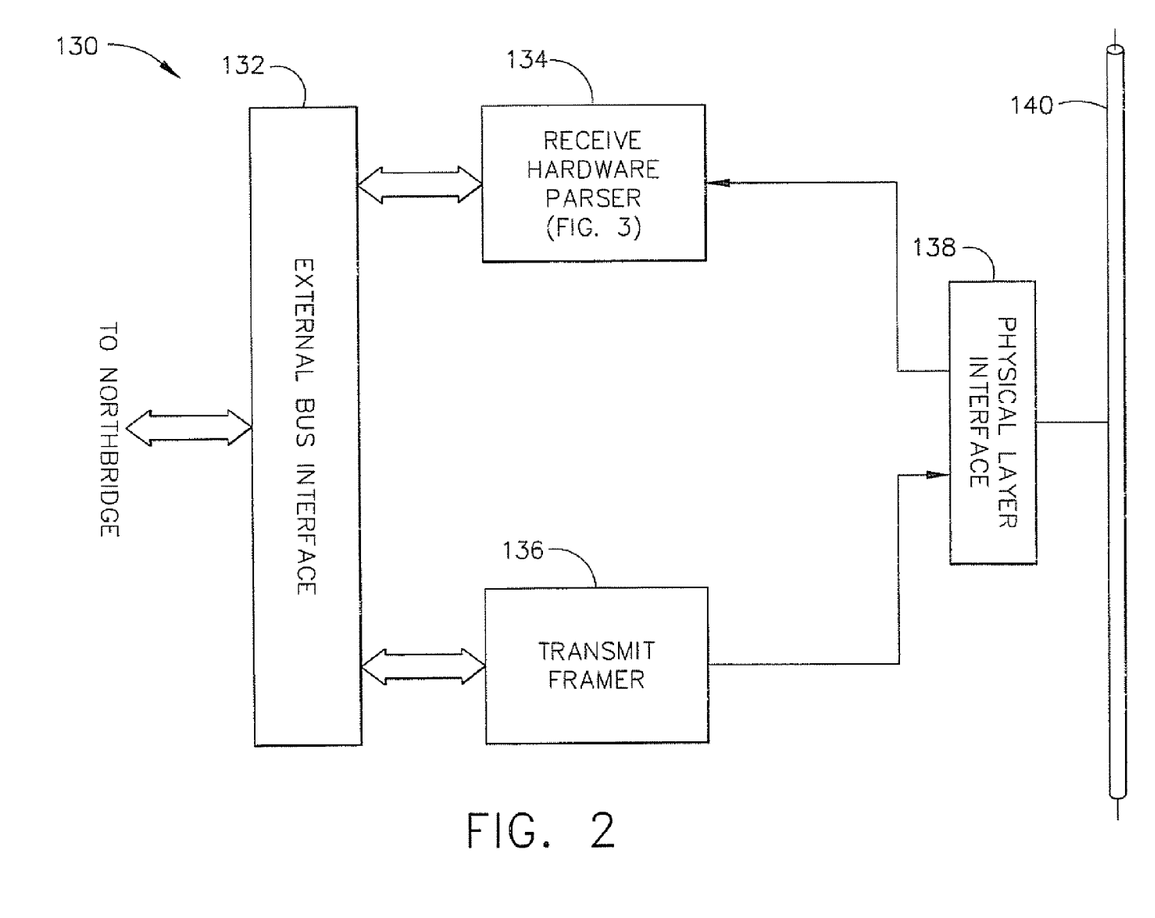
FIG. 2 illustrates a block diagram of the transport offload engine of FIG. 1.

FIG. 2 illustrates a block diagram of transport offload engine 130 of FIG. 1. TOE 130 includes generally an external bus interface 132, a receive hardware parser 134, a transmit framer 136, and a physical layer interface 138. Physical layer interface 138 is connected to an external medium 140 which is illustrated as a coaxial cable but in other embodiments may be fiber optic cable, copper twisted pair, or any other known medium having sufficient transmission characteristics to conduct the signals at the desired data rate. As illustrated external bus interface 132, receive hardware parser 134, transmit framer 136, and physical layer interface 138 are combined in a single integrated circuit, but in other embodiments physical layer interface 138 may be off-chip.

External bus interface 132 is adapted to couple to Northbridge 120 to conduct receive and transmit data streams at high speed. External bus interface 132 must support a high enough bandwidth to fill receive buffers or empty transmit buffers in main memory to support the physical layer data rate while avoiding excessive CPU bandwidth for additional protocol processing. For use with Gigabit Ethernet or 10 Gigabit Ethernet, external bus interface 132 supports a high speed version of the PCI interface known as "PCI Express" that complies with the PCI Express™ Specification, Rev. 1.0 available from the PCI Special Interest Group, or an interface known as "HyperTransport" that complies with the HyperTransport™ I/O Link Specification, Revision 1.03, © 2001 HyperTransport Technology Consortium. External bus interface 132 also includes direct memory access (DMA) circuitry (not shown) to perform the high data rate transfers efficiently.

Receive hardware parser 134 is a circuit that performs significant portions of the lower layer processing of a received frame. In TOE 130 this lower layer processing encompasses layers 2-4 of the OSI model. Receive hardware parser 134 examines received frame header and option information and activates selected parser circuits as the frame is processed in sequence through layers 2, 3, and 4. It outputs the layer 4 payload for storage in main memory, through external bus interface circuit 132, and further processing is performed by software.

Transmit framer 136 performs lower layer protocol processing and constructs transmit frames by appending lower protocol layer headers to a payload using conventional memory table based techniques. The frame so constructed is then provided to physical layer interface 138 which converts the data bits into a form for transmission on medium 140.

Figure 3:
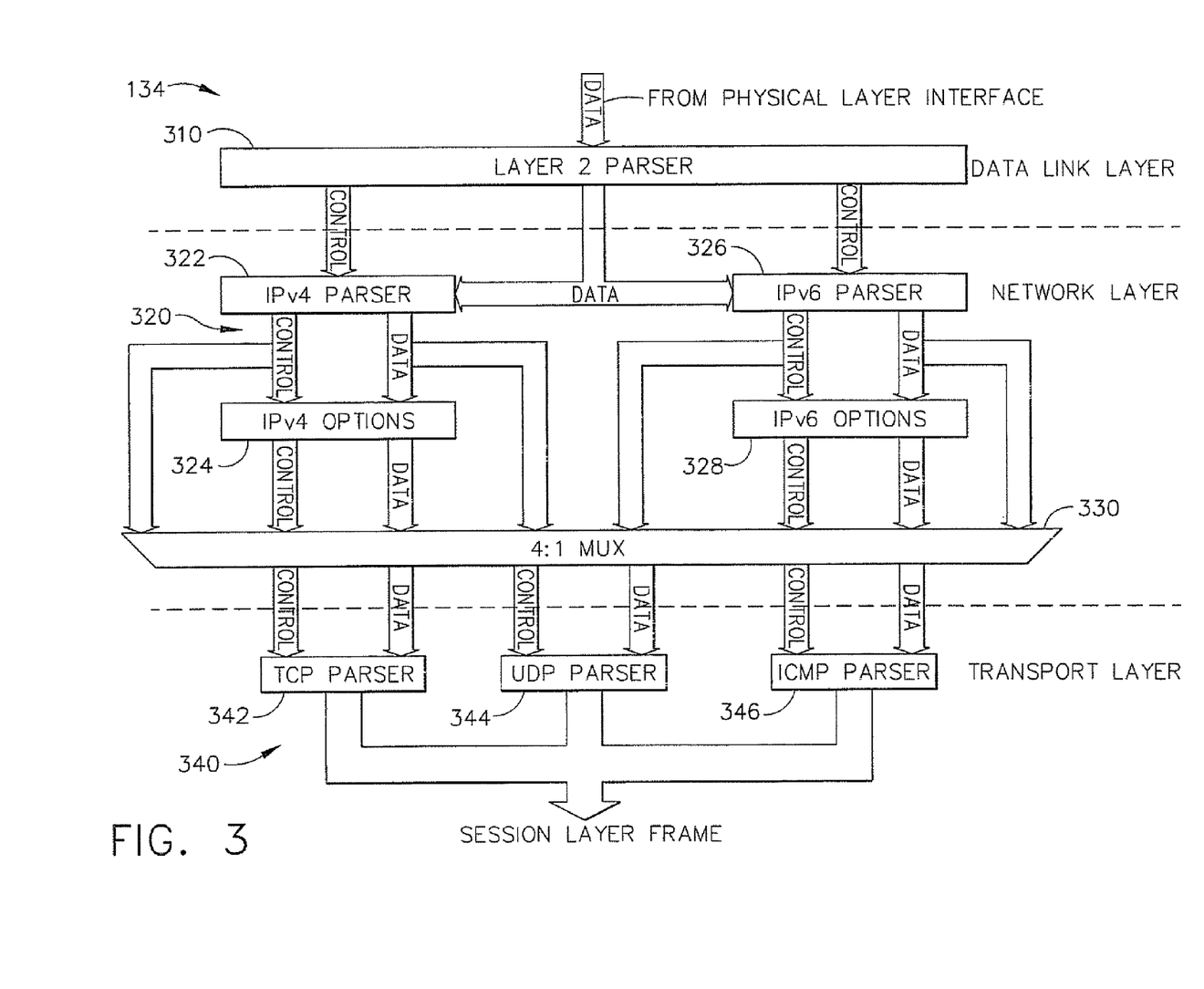
FIG. 3 is a block diagram that illustrates the flow of data and control signals of the receive hardware parser of FIG. 2 useful in understanding the present invention.

FIG. 3 is a block diagram that illustrates the flow of data and control signals of receive hardware parser 134 of FIG. 2 useful in understanding the present invention. In order to support the high data rates associated with Gigabit Ethernet and 10 Gigabit Ethernet, receive hardware parser 134 includes circuits at the data link layer, network layer, and transport layer. These circuits are generally in the form of finite state machines that take particular actions based on the contents of the headers and the state of the communication system. At the data link layer receive hardware parser 134 includes a layer 2 parser 310 that receives a stream of data from physical layer interface 138 and separates the header from the payload. Layer 2 parser 310 implements the Ethernet data link layer protocol defined by IEEE 802.3 by examining various portions of the frame and taking appropriate action.

Figure 4:
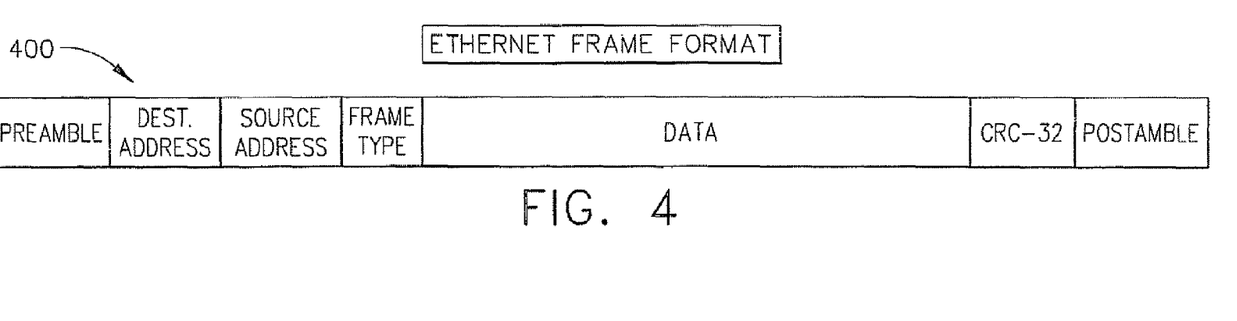
FIG. 4 illustrates an Ethernet data link layer frame format.

The operation of layer 2 parser 310 is better understood with reference to FIG. 4, which illustrates the format of an Ethernet frame 400. Layer 2 parser 310 must determine the start and end of the frame by looking for specific bit patterns known as the preamble and postamble, respectively, as defined by the Ethernet specification. After identifying the preamble, layer 2 parser 310 then examines the destination address to determine whether the frame is intended for this station. If the address does not match the address defined for this station, a portion of which may be masked for router applications, then layer 2 parser 310 ignores the remainder of the frame. If however the destination address of the frame matches the address defined for this station, layer 2 parser 310 reads the source address and determines the frame type.

Layer 2 parser 310 parses the data link layer frame and indicates appropriate status to other hardware circuitry, not shown in FIG. 4. This circuitry performs other tasks associated with the data link layer, such as transmitting acknowledge packets. It also computes a frame check sequence using an algorithm known as "CRC-32" and compares its computed CRC-32 value to the received CRC-32 value. If the values agree, it takes appropriate action such as causing the transmitter to send an acknowledgement. The DATA portion of the Ethernet frame then becomes an input to the network layer circuitry.

However in accordance with the present invention layer 2 parser circuit 310 examines a portion of the DATA field forming the network layer header to determine which network layer protocol is supported. Then it advantageously uses this information to activate a selected network layer parser circuit while keeping another potential network layer parser circuit inactive. The selected network layer parser circuit is then activated only while the network layer header is being received, which is the only portion of the frame that it is interested in.

Figure 5:
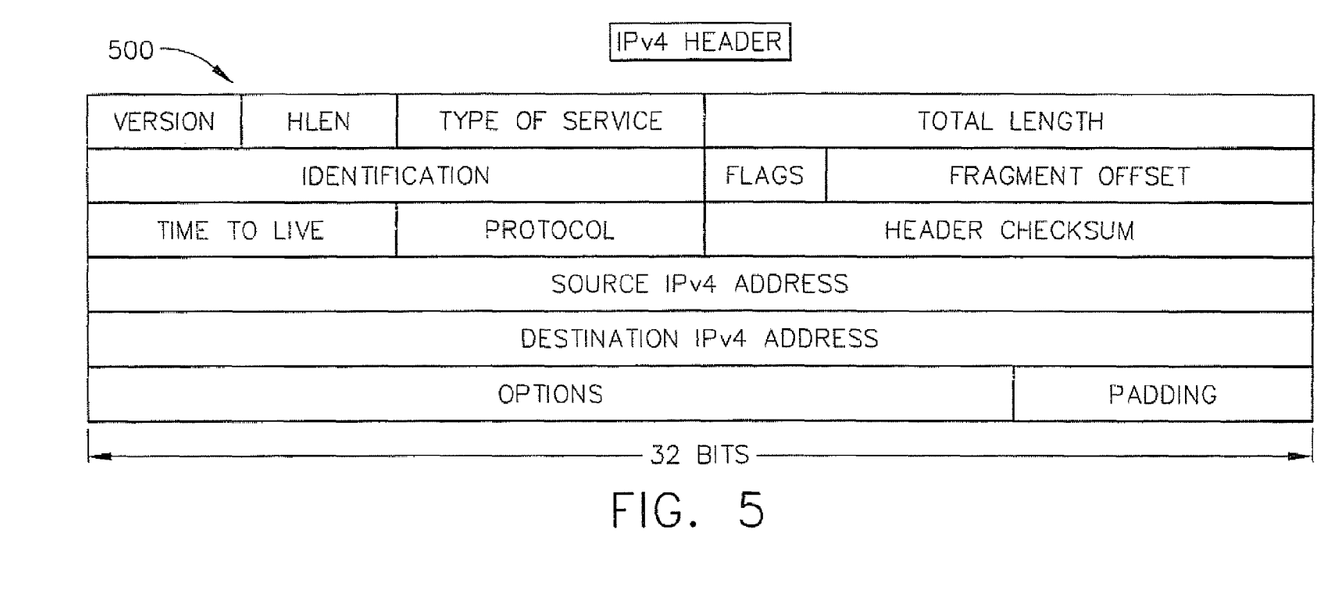
FIG. 5 illustrates an IPv4 network layer frame format.
Figure 6:
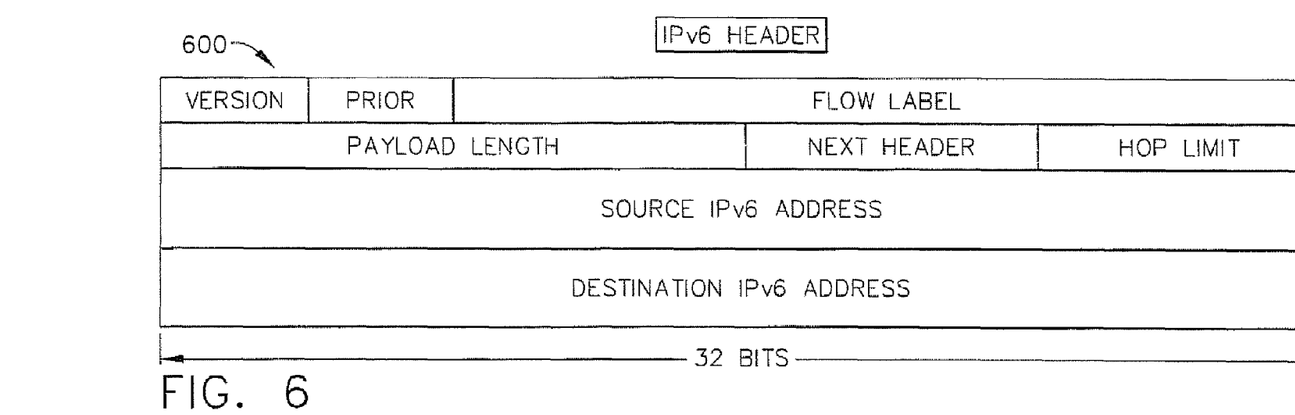
FIG. 6 illustrates an IPv6 network layer frame format.

This process is better understood with reference to FIGS. 5 and 6, which illustrate IPv4 and IPv6 network layer frame formats, respectively. The first four bits of both the IPv4 and IPv6 headers define a field known as the VERSION. Layer 2 parser 310 examines the VERSION field to determine whether IPv4 or IPv6 is the supported network layer protocol version.

Now considering FIG. 3 in conjunction with FIGS. 5 and 6, if the VERSION field indicates an IPv4 packet, then layer 2 parser circuit 310 activates IPv4 parser circuit 322, while keeping IPv6 parser 326 inactive using appropriate CONTROL signals. Likewise if the VERSION field indicates an IPv6 packet, then layer 2 parser circuit 310 activates IPv6 parser circuit 326, while keeping IPv4 parser 322 inactive using appropriate CONTROL signals. The Layer 2 DATA field then becomes the input datagram to the activated Network Layer parser circuit. In this way receive hardware parser 134 is both modular and consumes a minimum of power because circuitry that is not required for the selected protocol is not activated.

The selected one of IPv4 parser circuit 322 and IPv6 parser circuit 326 then checks for the presence of options. For the IPv4 protocol, the HLEN field signals the presence of options by indicating the length in bytes of the header. If HLEN=5, then the header has a length of five 32-bit words and does not include options. On the other hand if HLEN=6, then the header has a length of six 32-bit words and the last 32-bit word contains options and padding. For IPv6, the NEXT HEADER field defines whether an option header follows the regular header, or the next header is a Layer 4 header. The selected one of IPv4 parser 322 and IPv6 parser 326 activates a corresponding options circuit 324 or 328 when options are present.

To determine the selected transport layer protocol, IPv4 parser 322 examines the PROTOCOL field if the frame is an IPv4 frame, and IPv6 parser 326 examines the NEXT HEADER field if the frame is an IPv6 frame. If PROTOCOL/NEXT HEADER=1, then the network layer data field carries ICMP messages. If PROTOCOL/NEXT HEADER=6, then the network layer data field carries TCP segments. If PROTOCOL/NEXT HEADER=17, then the network layer data field carries UDP datagrams. Thus the selected network layer parser circuit examines this field, and selectively activates a corresponding transport layer parser circuit while keeping the other two transport layer parser circuits inactive. The selected transport layer parser circuit is then activated only while the transport layer header is being received, which is the only portion of the frame that it is interested in. TOE 134 supports the TCP protocol with TCP parser circuit 342, the UDP protocol with UDP parser circuit 344, and the ICMP protocol with ICMP parser circuit 346.

Figure 7:
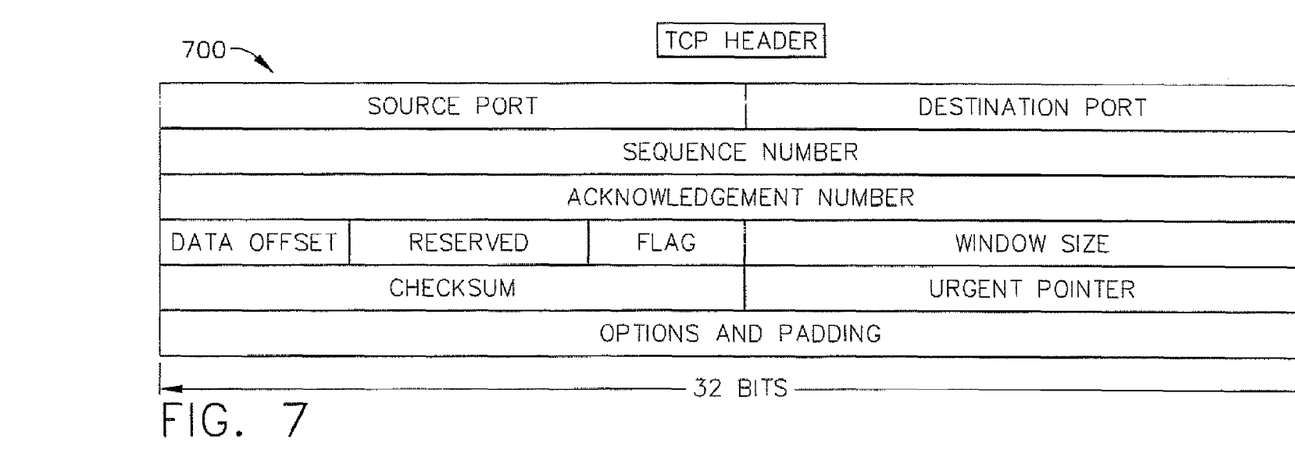
FIG. 7 illustrates a TCP transport layer frame format.
Figure 8:
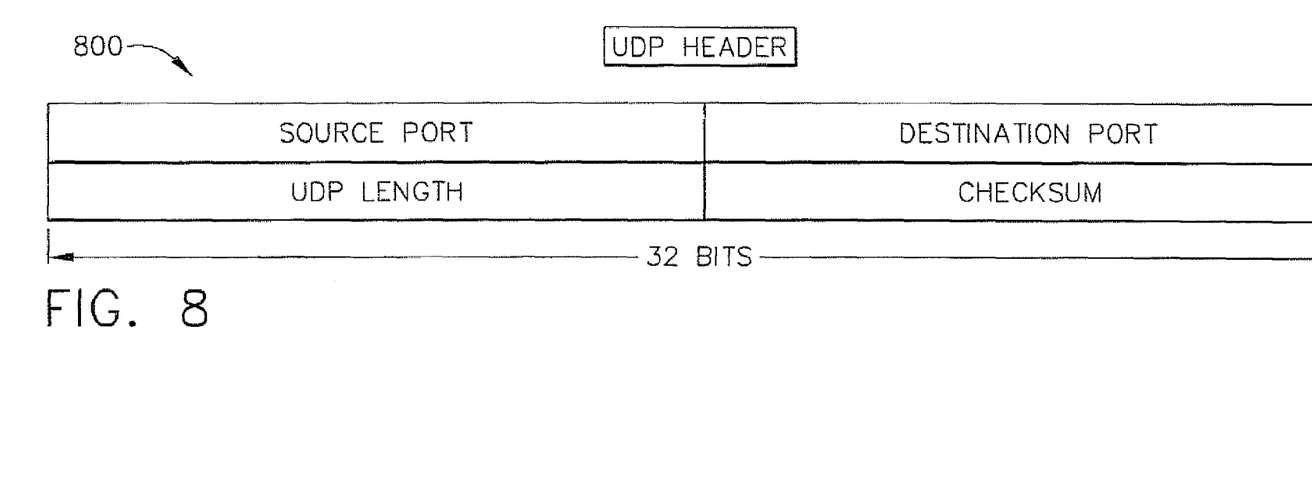
FIG. 8 illustrates a UDP transport layer frame format.
Figure 9:
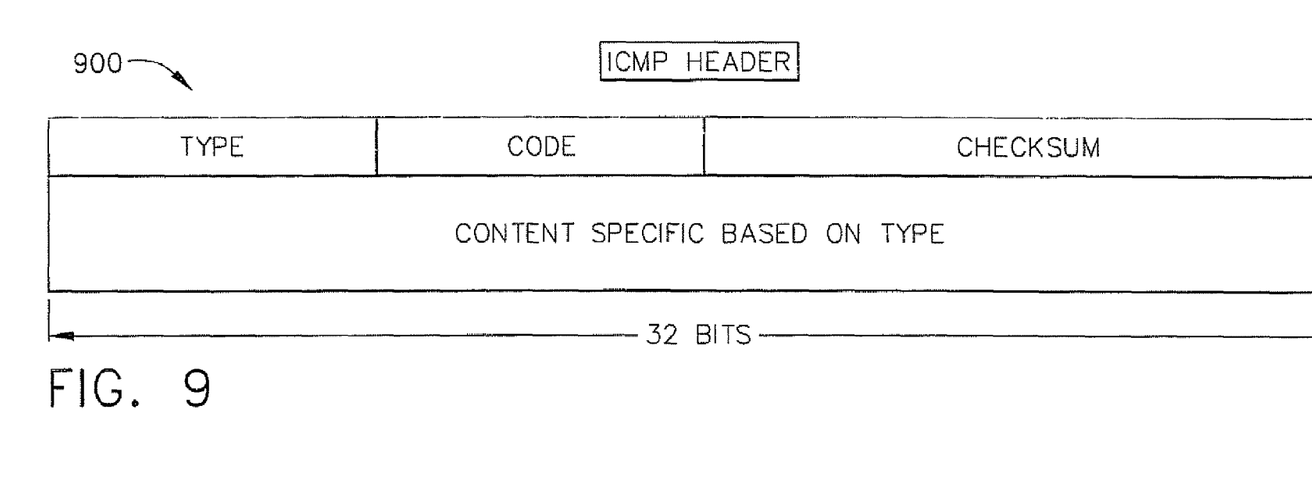
FIG. 9 illustrates an ICMP transport layer frame format.

FIGS. 7-9 illustrate a TCP header 700, a UDP header 800, and an ICMP header 900, respectively. Comparing these headers, it should be apparent that the transport layer processing will vary significantly based on the protocol selected. However the state machines that implement the protocols can be made to efficiently parse the selected type of frame when active.

Returning again to FIG. 3, the output of the selected transport layer parser circuit is provided as an input frame to the session layer. In TOE 130 hardware processes frames through the transport layer and software processes the session, presentation, and application layers. Thus while some protocol processing remains to be done by software running on CPU 110, transport offload engine 130 performs enough of the processing to support high speed protocols such as 10 Gigabit Ethernet.

Since TOE 130 maintains modularity, new protocols can be easily added or existing protocols can be deleted from the set of supported protocols. However a parser circuit at a given protocol layer is able to look ahead far enough into the next protocol layer to determine which of multiple parser circuits at that layer to activate. Power consumption is minimized since only that circuitry that is required to perform the selected protocol is enabled. The parser circuits themselves can be simplified since they are dedicated to a specific protocol. This simplification makes them easy to verify and debug.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A communication processor comprising:

a data link layer parser circuit having an input configured to receive a data link layer frame and remove a data link layer header therefrom to provide a network layer frame as an output; and a plurality of network layer parser circuits, each corresponding to a different one of a corresponding plurality of network layer protocols and configured to be selectively powered to receive said network layer frame and to remove a network layer header therefrom to provide a tort layer frame as an output;

wherein said data link layer parser circuit is configured to examine a portion of said network layer frame to determine which of said plurality of network protocols is used and power a corresponding one of said plurality of network layer parser circuits in response while keeping another one of said plurality of network layer parser circuits unpowered when said communication processor is operational.

2. The communication processor of claim 1 wherein said data link layer parser circuit and said plurality of network layer parser circuits are combined in a single integrated circuit.

3. The communication processor of claim 1 further comprising a physical layer interface circuit coupled to said data link layer parser circuit and adapted to be coupled to a data communication medium for providing a data link layer frame in response to electrical signals received from said data communication medium.

4. The communication processor of claim 1 further comprising means for processing said transport layer frame and for providing payload data to an application program.

5. The communication processor of claim 4 wherein said means for processing said transport layer frame comprises a plurality of transport layer parser circuits each corresponding to a different one of a corresponding plurality of transport protocols and configured to be selectively powered to receive said transport layer frame and to remove a transport layer header therefrom to provide a session layer frame as an output wherein said corresponding one of said plurality of network layer parser circuits is configured to selectively power one of said plurality of transport layer parser circuits in response to a field of the transport layer header.

6. The communication processor of claim 5 wherein said plurality of transport layer protocols comprises Transmission Control Protocol (TCP), User Datagram Protocol (UDP), and Internet Control Messaging Protocol (ICMP).

7. The communication processor of claim 1 wherein said plurality of network layer protocols comprises Internet Protocol version 4 (IPv4) and Internet Protocol version 6 (IPv6).

8. The communication processor of claim 1 wherein said data link layer protocol comprises IEEE 802.2 protocol.

9. The communication processor of claim 1 further comprising an interface to a data processing system.

10. The communication processor of claim 1 wherein a selected one of said plurality of network layer parser circuits is configured to further examine a second portion of said network layer frame and power a corresponding options circuit if said second portion of said network layer frame indicates that options are present.

11. A communication processor comprising:

a data link layer parser circuit having an input adapted to be coupled to a physical layer circuit and an output for providing a network layer frame;

a plurality of network layer parser circuits corresponding to different ones of a corresponding plurality of network layer protocols, each network layer parser circuit having an input coupled to said output of said data link layer parser circuit and an output;

a plurality of transport layer parser circuits corresponding to different ones of a corresponding plurality of transport layer protocols, each transport layer parser circuit having an input coupled to said outputs of said plurality of network layer parser circuits and an output for providing a session layer frame; and means for selectively powering one of said plurality of network layer parser circuits based on which of said plurality of network layer protocols is used and one of said plurality of transport layer parser circuits based on which of said plurality of transport layer protocols is used, wherein unselected ones of said plurality of network layer parser circuits and said plurality of transport layer parser circuits are not powered when said communication processor is operational.

12. The communication processor of claim 11 wherein a selected one of said plurality of network layer parser circuits is configured to examine a second portion of said network layer frame and power a corresponding options circuit if said second portion of said network layer frame indicates that options are present.

13. The communication processor of claim 11 wherein said means for selectively powering comprises circuitry in said data link layer parser circuit that is configured to examine a version field of a network layer header and select one of said plurality of network layer parser circuits in response.

14. The communication processor of claim 11 wherein said means for selectively powering comprises circuitry in a selected one of said plurality of network layer parser circuits that is configured to examine a field of a network layer header and select one of said plurality of transport layer parser circuits in response.

15. The communication processor of claim 14 wherein a selected protocol is Internet Protocol version 4 (IPv4) and said means for selectively powering comprises circuitry in said selected one of said network layer parser circuits that is configured to examine a PROTOCOL field of a network layer header and select said one of said plurality of transport layer parser circuits in response.

16. The communication processor of claim 14 wherein a selected protocol is Internet Protocol version 6 (IPv6) and said means for selectively powering comprises circuitry in said selected one of said network layer parser circuits that is configured to examine a NEXT HEADER field of a network layer header and select said one of said plurality of transport layer parser circuits in response.

17. A method for use in a data communication system comprising the steps of:

receiving a data link layer frame;

parsing said data link layer frame using a data link layer parser circuit to separate a data link layer header from a data link layer payload;

parsing said data link layer payload, using said data link layer parser circuit, to identify a network layer protocol associated with said data link layer frame;

powering, using said data link layer parser circuit a selected one of a plurality of network layer circuits corresponding to an identified network layer protocol while keeping another one of said plurality of network layer circuits empowered when said data communication system is operational; and processing said data link layer payload using said selected one of said plurality of network layer circuits.

18. The method of claim 17 wherein said step of receiving said data link layer frame comprises the step of receiving an Ethernet protocol frame.

19. The method of claim 17 wherein said powering comprises the step of powering, using said data link layer parser circuit a selected one of an Internet Protocol version 4 (IPv4) circuit and an Internet Protocol version 6 (IPv6) circuit.

20. The method of claim 17 wherein said step of processing said data link layer payload comprises the step of parsing a network layer header to provide a transport layer payload.

* * * * *

UNITED STATES PATENT AND TRADEMARK OFFICE
CERTIFICATE OF CORRECTION

PATENT NO. : 7,293,113 B1
APPLICATION NO. : 10/447824
DATED : November 6, 2007
INVENTOR(S) : Gopal Krishna et al.

It is certified that error appears in the above-identified patent and that said Letters Patent is hereby corrected as shown below:

Column No. 7, Line No. 23, change "tort" to --transport--

Column No. 7, Line No. 53, change "output wherein" to --output, wherein--

Column No. 9, Line No. 7, change "parser circuit a" to --parser circuit, a--

Column No. 9, Line No. 11, change "empowered" to --unpowered--

Column No. 10, Line No. 6, change "parser circuit a" to --parser circuit, a--

Signed and Sealed this

First Day of April, 2008

JON W. DUDAS
*Director of the United States Patent and Trademark Office*